US009894855B2

(12) United States Patent
Yano et al.

(10) Patent No.: US 9,894,855 B2
(45) Date of Patent: Feb. 20, 2018

(54) HYDROPONIC CULTIVATION APPARATUS AND HYDROPONIC CULTIVATION METHOD

(71) Applicant: PANASONIC INTELLECTUAL PROPERTY MANAGEMENT CO., LTD., Osaka (JP)

(72) Inventors: Hiroshi Yano, Osaka (JP); Ayumi Sakai, Aichi (JP); Sayaka Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 14/909,476

(22) PCT Filed: Mar. 3, 2014

(86) PCT No.: PCT/JP2014/001133
§ 371 (c)(1),
(2) Date: Feb. 2, 2016

(87) PCT Pub. No.: WO2015/037163
PCT Pub. Date: Mar. 19, 2015

(65) Prior Publication Data
US 2016/0183488 A1    Jun. 30, 2016

(30) Foreign Application Priority Data

Sep. 12, 2013  (JP) ................................ 2013-189512

(51) Int. Cl.
*A01G 31/00*  (2006.01)
*A01G 31/02*  (2006.01)
(Continued)

(52) U.S. Cl.
CPC ............. *A01G 31/02* (2013.01); *A01G 1/001* (2013.01); *A01G 7/045* (2013.01); *Y02P 60/146* (2015.11); *Y02P 60/216* (2015.11)

(58) Field of Classification Search
CPC .. A01G 31/00; A01G 31/02; A01G 2031/006; A01G 31/06
See application file for complete search history.

(56) References Cited

U.S. PATENT DOCUMENTS 5,136,804 A * 8/1992 Rothem ................. A01G 31/02
47/59 R
9,706,722 B2 * 7/2017 Sakai ..................... A01G 31/02
(Continued)

FOREIGN PATENT DOCUMENTS

EP        0 142 989      5/1985
JP        2010-273648   12/2010
(Continued)

OTHER PUBLICATIONS

Extended European Search Report for EP Appl. No. 14844527.3 dated Jun. 15, 2016.
(Continued)

*Primary Examiner* — Kristen C Hayes
(74) *Attorney, Agent, or Firm* — Greenblum & Bernstein, P.L.C.

(57) ABSTRACT

To grow a plant which stores nutrients synthesized in an above-ground part into an underground part, a hydroponic cultivation apparatus waters the underground part. The hydroponic cultivation apparatus includes: a void portion housing the underground part while establishing a substantially sealed state; a sensor which detects an amount of moisture in the void portion at the underground part or around the underground part; an air conditioning fan which introduces outside air to the void portion and controls temperature and humidity inside the void portion; and a
(Continued)

controller which controls the amount of moisture detected by the sensor by driving the air conditioning fan in such a way as to adjust an amount of the outside air or an introduction period of the outside air.

4 Claims, 2 Drawing Sheets

(51) Int. Cl.
  *A01G 7/04* (2006.01)
  *A01G 1/00* (2006.01)

(56) References Cited

U.S. PATENT DOCUMENTS

2010/0287830 A1  11/2010  Chen et al.
2016/0278313 A1* 9/2016  Kao ..................... A01G 9/246

FOREIGN PATENT DOCUMENTS

JP  2011-217729  11/2011
KR  10-2008-0108691  12/2008
KR  10-2011-0079496  7/2011

OTHER PUBLICATIONS

English-language translation of Official Action in KR Appl. No. 10-2016-7003667 dated Apr. 26, 2017.

* cited by examiner

HYDROPONIC CULTIVATION APPARATUS AND HYDROPONIC CULTIVATION METHOD

TECHNICAL FIELD

The present invention relates to a hydroponic cultivation apparatus and a hydroponic cultivation method to grow a plant body.

BACKGROUND ART

Developments of hydroponics designed to perform plant cultivation by soaking roots (underground parts) of plants in water without using soil are now in progress. Particularly in the case of root crops, surrounding conditions of roots are important factors in order to achieve good growth by the hydroponics. For example, high humidity at the roots may incur diseases or appropriate humidity management may promote growth of root hairs.

Techniques disclosed in the following PTL 1 and 2 have been known as techniques related to the hydroponics.

PTL 1 describes a method of promoting rapid growth of roots by realizing a highly humid condition. PTL 2 describes a technique to maintain a sufficient amount of moisture near roots by controlling an atomizer and an air controller using a signal from a dew sensor provided near a root holder.

However, the techniques described in the above-mentioned PTL 1 and 2 do not refer to environmental conditions at an underground part of a plant in a hydroponic cultivation apparatus.

In the meantime, the techniques described in PTL 1 and 2 state that it is desirable to establish a highly humid condition as a growth environment for a plant. Therefore, the techniques are not applicable to growing a plant body for which a highly humid condition is undesirable as its growth environment.

The present invention has been made in view of the aforementioned circumstances. An object of the present invention is to provide a hydroponic cultivation apparatus and a hydroponic cultivation method, which are capable of ameliorating an environment for an underground part of a plant.

CITATION LIST

Patent Literature

[PTL 1] Japanese Patent Application Publication No. 2010-110225
[PTL 2] Japanese Patent Application Publication No. Hei 3-15323

SUMMARY OF INVENTION

A hydroponic cultivation apparatus according to a first aspect of the present invention is designed to grow a plant which stores a nutrient synthesized in an above-ground part into an underground part, and is configured to water the underground part, wherein the hydroponic cultivation apparatus comprises: a void portion housing the underground part while establishing a substantially sealed state; a sensor configured to detect an amount of moisture in the void portion at the underground part or around the underground part; an outside air introduction unit configured to introduce outside air to the void portion; an air conditioning unit configured to control temperature and humidity inside the void portion; and a controller configured to control the amount of moisture detected by the sensor by driving the air conditioning unit in such a way as to adjust any of an amount of the outside air and an introduction period of the outside air to be introduced from the outside air introduction unit.

A hydroponic cultivation apparatus according to a second aspect of the present invention provides the hydroponic cultivation apparatus according to the first aspect, wherein the controller drives the air conditioning unit when the amount of moisture detected by the sensor reaches a first predetermined value, and thus adjusts any of the amount of the outside air and the introduction period of the outside air to be introduced from the outside air introduction unit to the void portion until the amount of moisture reaches a second predetermined value smaller than the first predetermined value.

A hydroponic cultivation apparatus according to a third aspect of the present invention provides the hydroponic cultivation apparatus according to the first or second aspect, wherein the outside air introduction unit comprises an opening provided to the void portion.

A hydroponic cultivation method according to a fourth aspect of the present invention provides a hydroponic cultivation method of growing a plant which stores a nutrient synthesized in an above-ground part into an underground part and is configured to water the underground part, wherein the hydroponic cultivation method comprises: detecting an amount of moisture at the underground part or around the underground part in a void portion housing the underground part while establishing a substantially sealed state in order to cultivate the underground part; and controlling the amount of moisture in such a way as to adjust any of an amount of outside air and an introduction period of the outside air to be introduced from an outside air introduction unit configured to introduce the outside air to the void portion.

DESCRIPTION OF EMBODIMENTS

An embodiment of the present invention will be described below with reference to the drawings.

Figure 1:
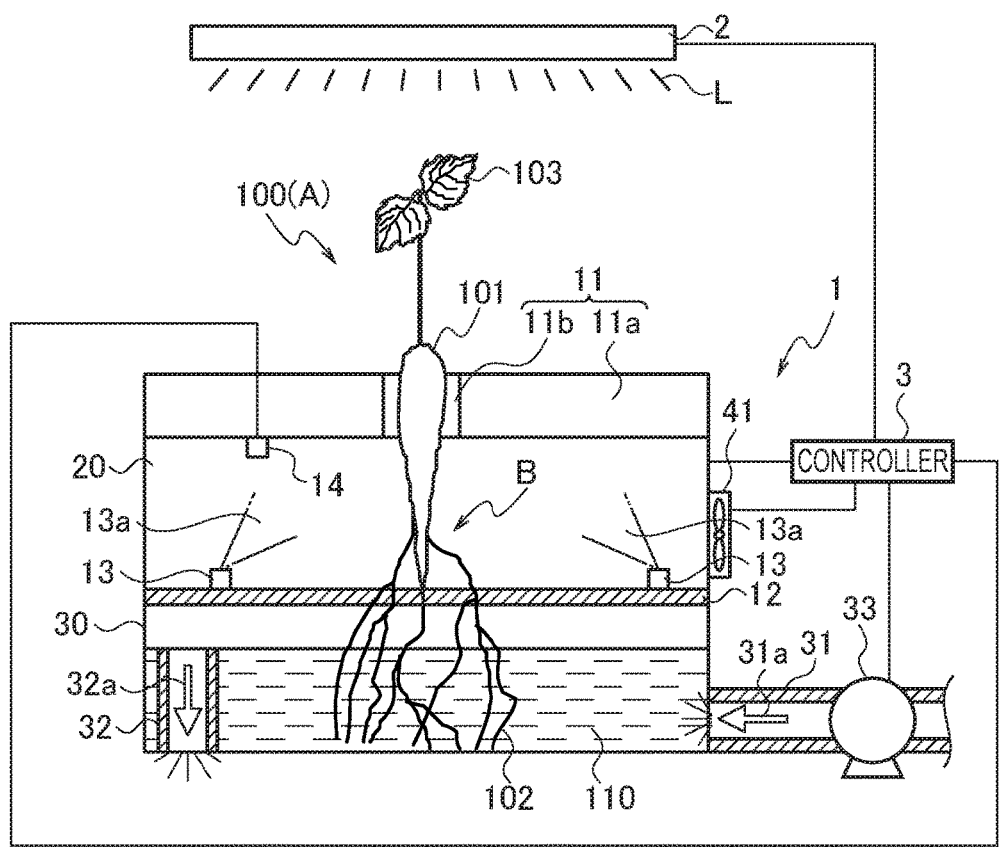
FIG. 1 is a cross-sectional view showing a configuration of a hydroponic cultivation apparatus illustrated as an embodiment of the present invention.
Figure 2:
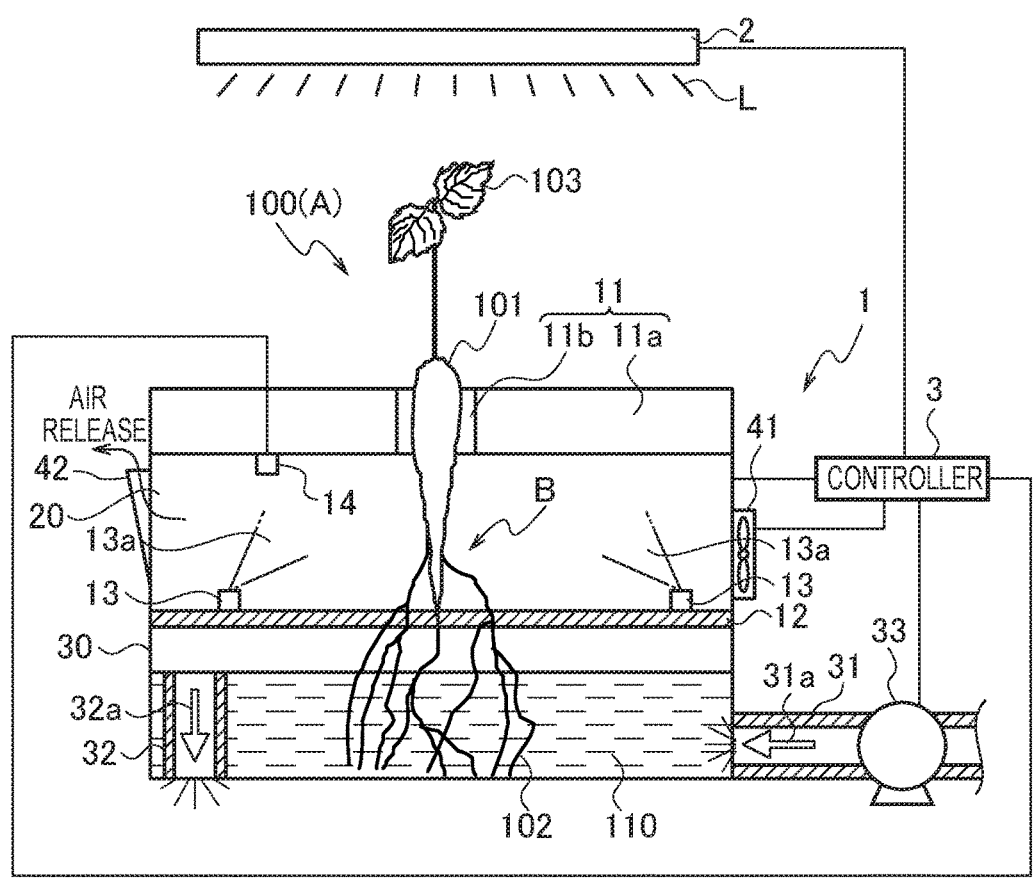
FIG. 2 is a cross-sectional view showing another configuration of the hydroponic cultivation apparatus illustrated as the embodiment of the present invention.

A hydroponic cultivation apparatus 1 adopting the present invention is configured as shown in FIG. 1 to FIG. 3, for example. The hydroponic cultivation apparatus 1 performs hydroponics for growing a plant body 100 without using soil.

The hydroponic cultivation apparatus 1 cultivates the plant body 100 by supplying a liquid to roots 101, 102 (an underground part B) of the plant body 100. The hydroponic cultivation apparatus 1 shown as the embodiment is described as one configured to grow a plant such as a root crop, which stores nutrients synthesized in an above-ground part A into the underground part B. Examples of such root crops include Panax ginseng (alias Korean ginseng or Chinese ginseng) which is illustrated as the plant body 100 in FIG. 1. Although this embodiment illustrates the Panax ginseng as the example of the plant body 100, the plant body 100 is not limited to the foregoing. Meanwhile, this embodiment describes a structure to supply a liquid to the plant body 100. Here, the liquid includes water, and a culture solution prepared by adding nutrients to water.

The hydroponic cultivation apparatus 1 shown in FIG. 1 grows the plant body 100 that has a taproot 101 and lateral roots 102. The hydroponic cultivation apparatus 1 includes a support section 11 (11a, 11b), a taproot watering section (12, 13), a lateral root watering section (30, 31, 32, 33), and a controller 3.

The support section 11 supports the plant body 100. The support section 11 includes a lid portion 11a and a penetrated portion 11b. The support section 11 supports the taproot 101 of the plant body 100 from sideways. In the hydroponic cultivation apparatus 1 shown in FIG. 1, the support section 11 may employ a columnar sponge in which the penetrated portion 11b is provided at a central position of the lid portion 11a, for example. Thus, the support section 11 supports the plant body 100 with a frictional force between the sponge and the plant body 100.

Note that the mode of the support section 11 is not limited so long as the support section 11 can support the plant body 100. The support section 11 may be designed to hang the above-ground part by using a material in the form of a string, for instance. Here, the lid portion 11a may be provided with two or more penetrated portions 11b.

Of the plant body 100 supported by the support section 11, an upper end of the taproot 101 is exposed from the lid portion 11a. A stem and leaves 103 of the plant body 100 grow upward out of the upper end of the taproot 101. A light source 2 is provided above the hydroponic cultivation apparatus 1. The light source 2 is formed from multiple LEDs, for example. The stem and leaves 103 can perform photosynthesis by receiving light L emitted from the light source 2.

The support section 11 is disposed above a culture tank 30. The support section 11 supports the taproot 101 of the plant body 100 with the penetrated portion 11b. In this way, the hydroponic cultivation apparatus 1 defines a void portion 20 to house the underground part B while establishing a substantially sealed state for cultivating the underground part B.

The taproot watering section waters the taproot 101 (the underground part B) by spraying an atomized liquid (mist) 13a onto the taproot 101 via the void portion 20 in the culture tank 30. The taproot watering section includes an attachment portion 12 and sprayers 13.

The attachment portion 12 is provided to an inner wall of the culture tank 30. For example, the attachment portion 12 may be designed to spray the liquid 13a from four ends of the culture tank 30 toward the center thereof. Meanwhile, the attachment portion 12 may be provided at an arbitrary height position in the culture tank 30 as long as the sprayers 13 can supply the liquid 13a to the taproot 101. One or more sprayers 13 are attached to the attachment portion 12.

Each sprayer 13 sprays the atomized liquid 13a. The sprayer 13 is connected to a not-illustrated liquid supply pipe. The sprayer 13 atomizes (forms mist from) the liquid 13a supplied through the liquid supply pipe, and jets the liquid 13a out of a nozzle.

Examples of this spaying mode include an atomization type using a high-pressure gas, an ultrasonic mist type, and the like. In addition, while the spraying mode preferably adopts a two-fluid mist mode, a single-fluid mist mode is also acceptable. Besides, the spraying mode may adopt an NFT mode or a DFT mode instead. Here, it is not always necessary to establish a substantially sealed system when the watering is conducted by the NFT or the DFT. Nonetheless, it is desirable to establish such a substantially sealed system in order to stabilize a condition of the underground part B.

Moreover, a sensor 14 configured to detect an amount of moisture is provided to the void portion 20. In this embodiment, the sensor 14 is attached to a face of the support section 11 on an underground part B side. Here, the sensor 14 may be provided on a wall face, a bottom face, or a ceiling face (a bottom face of the support section 11) in the void portion 20. Furthermore, the sensor 14 may be provided to at least one of the inside of the void portion 20, the support section 11, and the plant body 100 itself. In other words, the sensor 14 only needs to be capable of detecting the amount of moisture in the void portion 20 either at the underground part B or around the underground part B. The amount of moisture detected by the sensor 14 is sent to the controller 3.

In addition, an air conditioning fan 41 is installed in the culture tank 30. The air conditioning fan 41 (an air introduction unit) introduces air into the void portion 20 of the culture tank 30. Further, the air conditioning fan 41 is controlled by the controller 3. Thus, the air conditioning fan 41 also functions as an air conditioning unit that controls temperature and humidity inside the void portion 20.

Although FIG. 1 shows the example provided with the air conditioning fan 41, the present invention is not limited to the foregoing. For instance, outside air around the void portion 20 may be simply introduced as shown in FIG. 1, or dry air may be supplied to the void portion 20 by using a compressor, an air drier, and the like.

The controller 3 carries out the control for cultivating the plant body 100 with the hydroponic cultivation apparatus 1. The controller 3 may be a control device attached to the hydroponic cultivation apparatus 1, for example. Meanwhile, the controller 3 may be a personal computer, a mobile terminal, and the like owned by a user. Furthermore, the controller 3 may be connected not only to the single hydroponic cultivation apparatus 1 and the single light source 2, but also to multiple hydroponic cultivation apparatuses 1 and light sources 2.

The controller 3 stores data, which represent spraying intervals and spraying periods of the respective sprayers 13, in a memory in advance. Then, based on clock time measured by a not-illustrated timer, the controller 3 determines that a spraying interval has elapsed. Accordingly, the controller 3 causes each sprayer 13 to perform spraying for a preset spraying period. Thus, the controller 3 can give the liquid 13a from the desired sprayer 13 to the taproot 101 at the predetermined spraying interval and for the predetermined spraying period.

The lateral root watering section waters the lateral roots 102 by soaking the lateral roots 102 in a liquid 110. The lateral root watering section includes the culture tank 30, a liquid introduction passage 31, a liquid drain passage 32, and a circulation pump 33.

The culture tank 30 stores a liquid 31a introduced from the liquid introduction passage 31. The culture tank 30 stores the liquid 110 at a volume more than adequate for soaking the lateral roots 102 growing out of the taproot 101. In addition, the volume of the liquid 110 in the culture tank 30 is adjusted such that a surface of the liquid for watering the lateral roots 102 is located below a lower end of the taproot 101. This arrangement suppresses growth of rootlets which may be caused by the taproot 101 coming into contact with the liquid surface, and preserves the taproot 101 from decay and the like.

The circulation pump 33, which serves as a circulation unit to circulate the liquid 110 where the lateral roots 102 are soaked in, is connected to the liquid introduction passage 31. The number of rotations of the circulation pump 33 is adjusted in response to the control of the controller 3. As a consequence of adjusting the number of rotations of the circulation pump 33, it is possible to adjust an amount of the liquid 31*a* to be introduced from the liquid introduction passage 31 to the culture tank 30 and an amount of a liquid 32*a* to be drained from the liquid drain passage 32.

An amount of circulation of the liquid 110 in the culture tank 30 is adjusted as described above. The amount of circulation is adjusted in such a way as to be larger than an amount of watering the taproot 101 by the taproot watering section. Thus, the hydroponic cultivation apparatus 1 waters the lateral roots 102 with the larger amount of the liquid than the amount of the liquid supplied to the taproot 101. Note that the structure to circulate the liquid 110 in the culture tank 30 is not limited to the circulation pump 33, and a mode such as tilting the culture tank 30 is also applicable.

Moreover, the controller 3 is connected to the light source 2. The light source 2 is subjected to adjustment of time for irradiating the above-ground part A and other parameters, by the controller 3.

Furthermore, the controller 3 controls physical quantities (including the temperature and the humidity (the amount of moisture)) in the void portion 20 within appropriate ranges. To this end, the controller 3 adjusts either an amount or an introduction period of outside air to be introduced from an outside air introduction unit (the sensor 14). To achieve the adjustment, the controller 3 drives the air conditioning unit (the sensor 14). In this way, the controller 3 controls the amount of moisture detected by the sensor 14.

The amount or the introduction period of the outside air for controlling the amount of moisture varies depending on the type and the like of the plant body 100 to be cultivated. In other words, the amount of watering required by the sprayers 13 varies depending on the plant body 100. Moreover, the amount of moisture at the underground part B or around the underground part B appropriate for the growth of the plant body 100 varies depending on the plant body 100.

The controller 3 therefore controls the amount and the introduction period of the outside air depending on the preset amount of watering the plant body 100 and the appropriate amount of moisture. In this regard, the controller 3 drives the sensor 14 and adjusts the inside of the void portion 20 at the appropriate amount of moisture.

As described above, the hydroponic cultivation apparatus 1 waters the underground part B of the plant body 100, which stores the nutrients synthesized in the above-ground part A into the underground part B. Then, the hydroponic cultivation apparatus 1 uses the void portion 20 to house the underground part B in a substantially sealed state in order to cultivate the underground part B. In this state, the hydroponic cultivation apparatus 1 uses the sensor 14 to detect the amount of moisture in the void portion 20 at the underground part B or around the underground part B. Moreover, the hydroponic cultivation apparatus 1 includes the air conditioning fan 41, thereby being provided with the outside air introduction unit to introduce the outside air to the void portion 20, and the air conditioning unit to control the temperature and humidity inside the void portion 20. The hydroponic cultivation apparatus 1 controls the amount of moisture detected by the sensor 14 by driving the air conditioning fan 41 in such a way as to adjust the amount or the introduction period of the outside air introduced from the outside air introduction unit.

Thus, the hydroponic cultivation apparatus 1 can ameliorate the environment for the underground part B of the plant body 100. For example, the hydroponic cultivation apparatus 1 can suppress an increase in humidity in the void portion 20 even when the void portion 20 is in the substantially sealed state by way of the support section 11. Thus, the hydroponic cultivation apparatus 1 can inhibit the portion at the underground part B and the portion around the underground part B from being put in a state of excessive moisture.

Furthermore, the hydroponic cultivation apparatus 1 is provided with the air conditioning fan 41 for conditioning the air inside the void portion 20. Thus, the hydroponic cultivation apparatus 1 can efficiently suppress the state of excessive moisture in the void portion 20.

In the above-mentioned hydroponic cultivation apparatus 1, it is preferable that the controller 3 perform control such that the amount of moisture in the void portion 20 does not exceed a predetermined amount. To this end, the controller 3 determines whether or not the amount of moisture detected by the sensor 14 has reached a first predetermined value. The controller 3 drives the air conditioning fan 41 when the amount of moisture detected by the sensor 14 has reached the first predetermined value. The controller 3 determines whether or not the amount of moisture detected by the sensor 14 has reached a second predetermined value which is smaller than the first predetermined value. The controller 3 adjusts the amount or the introduction period of the outside air introduced from the air conditioning fan 41 until the amount of moisture detected by the sensor 14 reaches the second predetermined value.

The first predetermined value is such an amount of moisture in the void portion 20 as to avoid the state of excessive moisture for the plant body 100 when growing the plant body 100. The second predetermined value is an amount of moisture in the void portion 20 suitable for growing the plant body 100. The first predetermined value and the second predetermined value vary depending on the plant body 100. Accordingly, in the hydroponic cultivation apparatus 1, the first predetermined value and the second predetermined value corresponding to the plant body 100 are set up by an operation and the like of a grower of the plant body 100, for example.

Here, it is preferable that the controller 3 drive the air conditioning fan 41 and introduce the outside air at the timing when the sprayers 13 is not watering. In this way, the hydroponic cultivation apparatus 1 can stabilize the state of watering the plant body 100. Specifically, the hydroponic cultivation apparatus 1 can suppress scatter of the liquid 13*a* in the state of mist as a consequence of the introduction of the outside air to the void portion 20.

Moreover, the hydroponic cultivation apparatus 1 may include a shutter mechanism. The shutter mechanism is configured to shield the liquid 13*a* as well as the underground part B from direct exposure to the outside air so as to suppress the scatter of the liquid 13*a* in the state of mist. Thus, it is possible to inhibit the outside air inside the void portion 20 from flowing out as a consequence of driving the air conditioning fan 41.

According to the above-described hydroponic cultivation apparatus 1, it is possible to conduct the control such that the amount of moisture inside the void portion 20 reaching the first predetermined value is led to the second predetermined value. Thus, the hydroponic cultivation apparatus 1 can perform the control such that the amount of moisture in the void portion 20 becomes the second predetermined value by the control of the controller 3. Therefore, the hydroponic cultivation apparatus 1 can accurately inhibit the inside of the void portion 20 from being put into the state of excessive moisture.

Furthermore, in the hydroponic cultivation apparatus 1, the void portion 20 may be provided with an opening 42 as shown in FIG. 2. The opening 42 is provided to a wall face of the void portion 20. Note that the location to provide the opening 42 is not limited to the wall face of the void portion 20. The opening 42 may be provided to the support section 11 instead.

The hydroponic cultivation apparatus 1 thus configured releases the air containing the moisture in the void portion 20 to the outside of the void portion 20. The opening 42 can release the moisture naturally out of the void portion 20. Accordingly, the hydroponic cultivation apparatus 1 can inhibit the amount of moisture in the void portion 20 from becoming excessive.

It is to be noted that the above-described embodiment is a mere example of the present invention. In this context, the present invention is not limited to the above-described embodiment, and various modifications other than this embodiment are of course possible as long as such modifications remain within the scope not departing from the technical idea according to the present invention.

The entire contents of Japanese Patent Application No. 2013-189512 (filing date: Sep. 12, 2013) are incorporated herein.

INDUSTRIAL APPLICABILITY

According to the present invention, the outside air is introduced to the void portion that houses the underground part. Thus, it is possible to ameliorate the environment for the underground part of the plant.

REFERENCE SIGNS LIST

A above-ground part
B underground part
1 hydroponic cultivation apparatus
3 controller
14 sensor
20 void portion
41 air conditioning fan
42 opening
100 plant body

The invention claimed is:

1. A hydroponic cultivation apparatus designed to grow a plant which stores a nutrient synthesized in an above-ground part into an underground part, and configured to water the underground part, the hydroponic cultivation apparatus comprising:
   a void portion housing the underground part while establishing a substantially sealed state;
   a sensor configured to detect an amount of moisture in the void portion at the underground part or around the underground part;
   an outside air introduction unit configured to introduce outside air to the void portion;
   an air conditioning unit configured to control temperature and humidity inside the void portion; and
   a controller configured to control the amount of moisture detected by the sensor by driving the air conditioning unit in such a way as to adjust any of an amount of the outside air and an introduction period of the outside air to be introduced from the outside air introduction unit.

2. The hydroponic cultivation apparatus according to claim 1, wherein the controller drives the air conditioning unit when the amount of moisture detected by the sensor reaches a first predetermined value, and thus adjusts any of the amount of the outside air and the introduction period of the outside air to be introduced from the outside air introduction unit to the void portion until the amount of moisture reaches a second predetermined value smaller than the first predetermined value.

3. The hydroponic cultivation apparatus according to claim 1, wherein the outside air introduction unit comprises an opening provided to the void portion.

4. A hydroponic cultivation method of growing a plant which stores a nutrient synthesized in an above-ground part into an underground part, the hydroponic cultivation method being configured to water the underground part, comprising:
   detecting an amount of moisture at the underground part or around the underground part in a void portion housing the underground part while establishing a substantially sealed state in order to cultivate the underground part; and
   controlling the amount of moisture in such a way as to adjust any of an amount of outside air and an introduction period of the outside air to be introduced from an outside air introduction unit configured to introduce the outside air to the void portion.

* * * * *